(12) United States Patent
Cahill et al.

(10) Patent No.: US 7,113,627 B1
(45) Date of Patent: Sep. 26, 2006

(54) LOCATION OF EXTENDED LINEAR DEFECTS

(75) Inventors: Nathan D. Cahill, Rochester, NY (US); John P. Spence, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 1019 days.

(21) Appl. No.: 09/635,178

(22) Filed: Aug. 9, 2000

(51) Int. Cl.
*G06K 9/00* (2006.01)

(52) U.S. Cl. ...................................... 382/141; 358/448
(58) Field of Classification Search ................ 382/141, 382/207, 168–170, 190, 202; 250/559.02; 356/443, 444
See application file for complete search history.

(56) References Cited

U.S. PATENT DOCUMENTS

| | | | | |
|---|---|---|---|---|
| 3,718,074 A | | 2/1973 | Davis | 396/315 |
| 3,970,857 A | * | 7/1976 | Buckson | 250/559.1 |
| 4,170,419 A | * | 10/1979 | Van Tyne et al. | 356/431 |
| 4,211,558 A | | 7/1980 | Oguchi et al. | 430/359 |
| 4,260,245 A | | 4/1981 | Hujer | 355/40 |
| 4,365,882 A | | 12/1982 | Disbrow | 396/315 |
| 4,464,045 A | | 8/1984 | Findeis et al. | 355/38 |
| 4,577,961 A | | 3/1986 | Terashita | 355/77 |
| 4,634,850 A | | 1/1987 | Pierce et al. | 369/44.26 |
| 4,669,885 A | * | 6/1987 | Ina | 356/443 |
| 4,786,792 A | | 11/1988 | Pierce et al. | 235/456 |
| 4,874,936 A | | 10/1989 | Chandler et al. | 235/494 |
| 4,881,095 A | | 11/1989 | Shidara | 396/569 |
| 4,884,102 A | | 11/1989 | Terashita | 355/77 |
| 4,939,354 A | | 7/1990 | Priddy et al. | 235/456 |
| 5,036,405 A | * | 7/1991 | Kojima | 358/448 |
| 5,068,799 A | * | 11/1991 | Jarrett, Jr. | 702/40 |
| 5,075,716 A | | 12/1991 | Jehan et al. | 355/1 |
| 5,113,081 A | * | 5/1992 | Bryant | 250/559.02 |
| 5,189,521 A | | 2/1993 | Ohtsubo et al. | 358/296 |
| 5,198,907 A | | 3/1993 | Walker et al. | 358/296 |
| 5,267,030 A | | 11/1993 | Giorgianni et al. | 358/527 |
| 5,274,243 A | * | 12/1993 | Hochgraf | 250/559.41 |
| 5,400,116 A | * | 3/1995 | Jehan et al. | 355/53 |
| 5,430,522 A | * | 7/1995 | Kobayashi et al. | 355/27 |
| 5,440,648 A | * | 8/1995 | Roberts et al. | 382/141 |
| 5,452,055 A | | 9/1995 | Smart | 355/68 |
| 5,519,510 A | | 5/1996 | Edgar | 358/471 |
| 5,565,958 A | * | 10/1996 | Kaplan | 355/67 |
| 5,591,956 A | | 1/1997 | Longacre, Jr. et al. | 235/462.1 |
| 5,641,971 A | * | 6/1997 | Prigent | 250/559.02 |

(Continued)

FOREIGN PATENT DOCUMENTS

EP 0962201 A1 3/1997

(Continued)

OTHER PUBLICATIONS

U.S. Appl. No. 60/211,058 filed Jun. 3, 2000 by Levy et al.

(Continued)

*Primary Examiner*—Bhavesh M. Mehta
*Assistant Examiner*—Sath V. Perungavoor
(74) *Attorney, Agent, or Firm*—Paul A. Leipold

(57) ABSTRACT

A method of locating a linear defect on a photographic element, the element having a useful imaging width and the defect aligned with length of the element, includes the steps of: exposing a region of the element to create a latent image which is substantially uniform across the useful imaging width of the element; developing the latent image to produce a density signal; sampling the density signal with a photometric device; and analyzing the sampled density data for the presence of significant deviations aligned with the length of the element to locate the defect.

20 Claims, 2 Drawing Sheets

U.S. PATENT DOCUMENTS

| | | | |
|---|---|---|---|
| 5,649,260 A | 7/1997 | Wheeler et al. | 396/569 |
| 5,667,944 A * | 9/1997 | Reem et al. | 430/359 |
| 5,696,591 A * | 12/1997 | Bilhorn et al. | 356/429 |
| 5,698,382 A | 12/1997 | Nakahanada et al. | 430/418 |
| 5,736,996 A | 4/1998 | Takada et al. | 347/19 |
| 5,747,217 A * | 5/1998 | Zaklika et al. | 430/158 |
| 5,758,223 A | 5/1998 | Kobayashi et al. | 396/604 |
| 5,767,983 A | 6/1998 | Terashita | 358/302 |
| 5,832,328 A | 11/1998 | Ueda | 396/572 |
| 5,987,187 A * | 11/1999 | Wischermann | 382/275 |
| 5,988,896 A | 11/1999 | Edgar | 396/604 |
| 6,280,914 B1 | 8/2001 | Keech et al. | |
| 6,284,445 B1 | 9/2001 | Keech et al. | |
| 6,407,767 B1 | 6/2002 | Bigelow et al. | |
| 6,456,798 B1 | 9/2002 | Keech et al. | |
| 6,487,321 B1 * | 11/2002 | Edgar et al. | 382/260 |
| 7,027,104 B1 * | 4/2006 | Weston et al. | 348/616 |
| 2001/0021016 A1 * | 9/2001 | Shimoda | 356/239.1 |
| 2002/0037462 A1 * | 3/2002 | Ogata et al. | 430/30 |
| 2002/0097384 A1 * | 7/2002 | Nishikawa | 355/41 |
| 2002/0131631 A1 * | 9/2002 | Houge et al. | 382/149 |

FOREIGN PATENT DOCUMENTS

| | | |
|---|---|---|
| EP | 0926550 A1 | 6/1999 |
| JP | 11-316448 | 11/1999 |

OTHER PUBLICATIONS

U.S. Appl. No. 60/211,446 filed Jun. 3, 2000 by Irving et al.
U.S. Appl. No. 60/211,065 filed Jun. 3, 2000 by Irving et al.
U.S. Appl. No. 60/211,079 filed Jun. 3, 2000 by Irving et al.
U.S. Appl. No. 09/636,058 filed Aug. 9, 2000 by Keech et al.
U.S. Appl. No. 09/635,600 filed Aug. 9, 2000 by Keech et al.

* cited by examiner

LOCATION OF EXTENDED LINEAR DEFECTS

FIELD OF THE INVENTION

The present invention relates to photography and more particularly to extended linear defect location on a photographic element in digital photofinishing applications.

BACKGROUND OF THE INVENTION

Extended linear defects in scanned renditions of images on photographic elements, such as film, commonly occur. Such defects include, but are not limited to scratches, digs, processing draglines, coating streakiness, coating waviness, scanner defects, etc. For example, during the manufacture of photographic elements, defects in the coating process can lead to narrow regions, referred to as streaks, along the length of the photographic element in which one or more of the light-sensitive layers are affected. Because of the affected layer or layers, there is a change in the amount of light-sensitive material and/or coupler in the streak region. This manifests itself in abnormal characteristic data in the streak region. In a second example, a dirt particle in a camera can lead to a developable latent image formed by pressure sensitization when film is transported over the dust particle which is manifested as an extended linear defect.

The use of reference calibration patches exposed on a roll of film to enable better exposure control during optical printing is known in the art. See for example U.S. Pat. No. 5,767,983 issued Jun. 16, 1998 to Terashita entitled *Color Copying Apparatus for Determining Exposure Amount from Image Data of an Original Image and a Reference Image*. The use of reference calibration patches has also been shown to be useful in determining correction values for scanned film data used in digital printing. See for example U.S. Pat. No. 5,667,944 issued Sep. 16, 1997 to Reem et al. entitled *Digital Process Sensitivity Correction*; and U.S. Pat. No. 5,649,260 issued Jul. 15, 1997 to Wheeler et al. entitled *Automated Photofinishing Apparatus*.

Although extended linear defects can lead to undesirable artifacts in images of scenes, the effects of such defects when they occur in reference calibration images containing sensitometrically exposed patches can be even more detrimental. If such defects can be detected and located, the location of the image defect can be fed into software intended to measure sensitometric patches, enabling such software to avoid using data derived from the defective region or apply appropriate reconstruction techniques to recover affected data.

In the prior art, U.S. Pat. No. 5,736,996 issued Apr. 7, 1998 to Takada et. al., entitled *Image Reading Apparatus with a Function for Correcting Nonuniformity in Recording Density*, and U.S. Pat. No. 5,189,521 issued Feb. 23, 1993 to Ohtsubo et. al. entitled *Image Forming Apparatus and Method for Correction Image Density Non-Uniformity by Reading a Test Pattern Recorded by the Apparatus*, describe methods of automatically detecting image nonuniformities by laying down a test target on a recording medium. However, the nonuniformites of interest are inherent to a recording head and not the presumably uniform medium onto which the image is recorded. Once a nonuniformity is detected, the recording head is automatically calibrated to deliver uniform densities to the recording medium despite nonuniformities in the recording head. This prior art fails to repair the nonuniformity when such defects arise in the recording medium rather than the recording device or occur after the recording step, as the location and severity of the defects in the medium cannot be determined at the time of printing reference calibration targets.

Standard techniques for locating linear objects in digitized images, illustratively image segmentation and description techniques as described in *Digital Image Processing* by Rafael Gonzalez and Paul Wintz, Addison-Wesley Publishing Company, Reading, Mass., 1977, may be applied to locate such defects in a nominally uniform sensitometric patch. However, in patches with exposures which exhibit low signal to noise ratios, such detection algorithms break down. Failure to detect a defect in such a patch could lead to bias in estimates of density or noise levels in the patch. Use of corrupted data in a calibration procedure could affect entire images in a deleterious fashion. Further, in highly structured nonuniform images such as two-dimensional barcodes, these standard techniques fail to reliably distinguish between linear features that are part of the barcode and those that arise from an artifact.

Accordingly there is a need for an improved method to detect and locate linear defects in scanned images of photographic elements.

SUMMARY OF THE INVENTION

The need is met according to the present invention by providing a method of locating a linear defect on a photographic element, the element having a useful imaging width and the defect aligned with length of the element, that includes the steps of: exposing a region of the element to create a latent image which is substantially uniform across the useful imaging width of the element; developing the latent image to produce a density signal; sampling the density signal with a photometric device; and analyzing the sampled density data for the presence of significant deviations aligned with the length of the element to locate the defect.

DETAILED DESCRIPTION OF THE INVENTION

Figure 1:
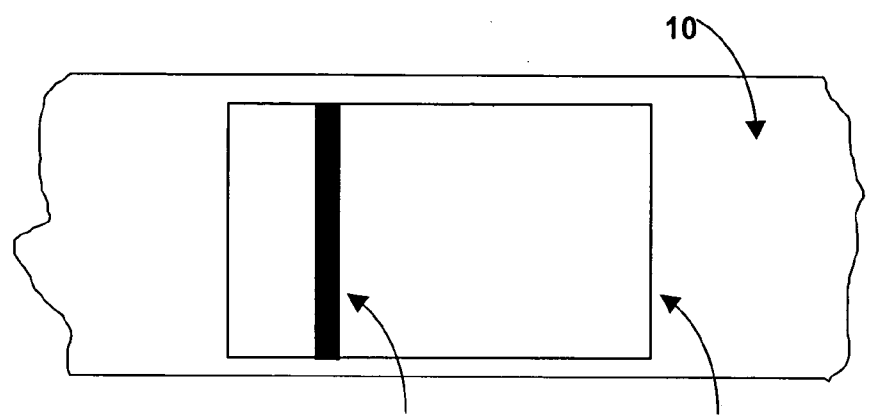
FIG. 1 is a schematic diagram of a film strip comprising a defect detection exposure according to the present invention.

According to the present invention, a region spanning the width of a typical exposure region on a photographic element, for example the useful width of a film frame on a film strip, is exposed with a sufficiently uniform exposure.

A photographic element includes at least a base with a photosensitive layer that is sensitive to light to produce a developable latent image. The photosensitive layer may contain conventional silver halide chemistry, or other photosensitive materials such as thermal or pressure developable chemistries. It can have a transparent base, a reflective base, or a base with a magnetically sensitive coating. The photographic element can be processed through standard chemical processes, including but not limited to Kodak Processes C-41 and its variants, ECN-2, VNF-1, ECP-2 and its variants, D-96, D-97, E-4, E-6, K-14, R-3, and RA-2SM, or RA-4; Fuji Processes CN-16 and its variants, CR-6, CP-43FA, CP-47L, CP-48S, RP-305, RA-4RT; Agfa MSC 100/101/200 Film and Paper Processes, Agfacolor Processes 70, 71, 72 and 94, Agfachrome Processes 44NP and 63; and Konica Processes CNK-4, CPK-2-22, DP, and CRK-2, and Konica ECOJET HQA-N, HQA-F, and HQA-P Processes. The photographic element can be processed using alternate processes such as apparently dry processes that may retain some or all of the developed silver or silver halide in the element or that may include lamination and an appropriate amount of water added to swell the photographic element. Depending upon the design of the photographic element, the photographic element can also be processed using dry processes that may include thermal or high pressure treatment. The processing may also include a combination of apparently dry, dry, and traditional wet processes. Examples of suitable alternate and dry processes include the processes disclosed in: U.S. Ser. Nos. 60/211,058 filed Jun. 3, 2000 by Levy et al.; 60/211,446 filed Jun. 3, 2000 by Irving et al.; 60/211,065 filed Jun. 3, 2000 by Irving et al.; 60/211,079 Jun. 3, 2000 by Irving et al.; EP Patent No. 0762201A1 published Mar. 12, 1997, by Ishikawa et al., entitled *Method of Forming Images*; EP Patent No. 0926550A1, published Dec. 12, 1998, by Iwai, et al., entitled *Image Information Recording Method*; U.S. Pat. No. 5,832,328 issued Nov. 3, 1998 to Ueda, entitled *Automatic Processing Machine for a Silver Halide Photographic Light-sensitive Material*; U.S. Pat. No. 5,758,223 issued May 26, 1998 to Kobayashi, et al., entitled *Automatic Processing Machine for Silver Halide Photographic Light-sensitive Material*; U.S. Pat. No. 5,698,382 issued Dec. 16, 1997 to Nakahanada, et al., entitled *Processing Method for Silver Halide Photographic Light-sensitive Material*; U.S. Pat. No. 5,519,510 issued May 21, 1996 to Edgar, entitled *Electronic Film Development*; and U.S. Pat. No. 5,988,896 issued Nov. 23, 1999 to Edgar, entitled *Method and Apparatus for Electronic Film Development*. It is noted that in the processes disclosed by Edgar, development and scanning of the image occur simultaneously. Accordingly, it is the intent of the present invention that any development and scanning steps can be performed simultaneously.

Once the photographic element has been processed and the sample image digitized, all of the pixel values, or a cross-section spanning the width of the exposure region, are compared. If a small region of pixels parallel to the length of the photographic element exhibits values throughout that differ significantly from values exhibited in the other areas of the uniform exposure region, a linear defect has been located in the corresponding position on the photographic element.

Referring to FIG. 1, in a preferred embodiment, a reference image of sufficiently uniform exposure 12 is exposed onto a photographic film strip 10 so that the reference image spans the width of an image frame 14.

Preferably for detection of coating defects, the exposure level is chosen to be high enough that all layers of the film are actively involved in producing density upon development of the latent image formed by the exposure. Preferably for detecting additional density induced by local pressure variation or scratches, the exposure level is chosen low enough that additional density due to such sources is visible above the overall density of the reference image. For example, for Advantix 200 film manufactured by Eastman Kodak Company, Rochester, N.Y., an appropriate exposure is adequate to produce a density of 1.5 above Dmin. In this case, where the photographic element is a color negative photographic film having a plurality of layers, the exposure is high enough to produce a latent image that is developable in all layers of the film and low enough to produce a latent image that upon development allows detection of any additional density due to a defect. The same principle applies for any multilayer negative film, including for example, any multilayer monochrome film.

It may not be possible to choose a single exposure level that satisfies both of the above noted requirements. In such a case, a plurality of exposure levels varying along the length of the film strip can be used.

Figure 2:
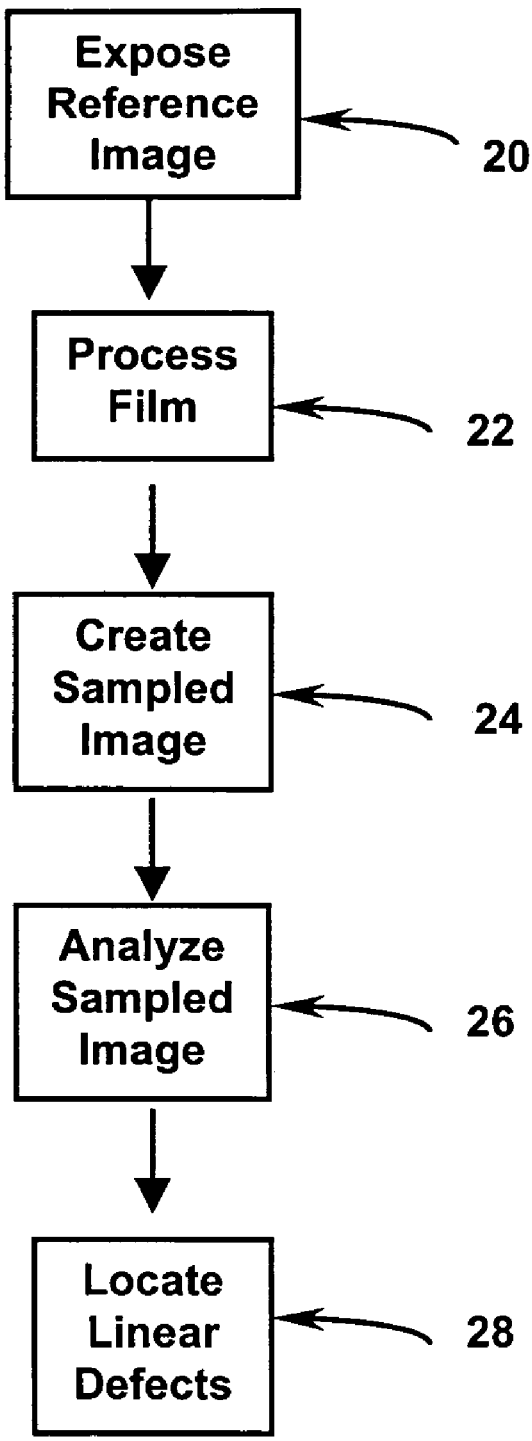
FIG. 2 is a diagram comprising the steps in a method for defect detection according to the present invention.

Referring to FIG. 2, the steps in the method for locating a longitudinal linear defect are described. A uniform exposure 12 is first exposed (20) onto a photographic film strip to record a latent image. The film strip is next processed (22) to produce a density signal from the recorded latent image. Then, a sampled image is generated (24) through photometric measurements, preferably by scanning the developed image with a film scanner and digitizing the output of the scanner. The sampled image is then analyzed (26) in order to determine if there are any regions where the uniformity differs from that of the uniform exposure 12. If any such regions are found that are aligned with the length of the film strip, a linear defect has been located (28).

Figure 3:
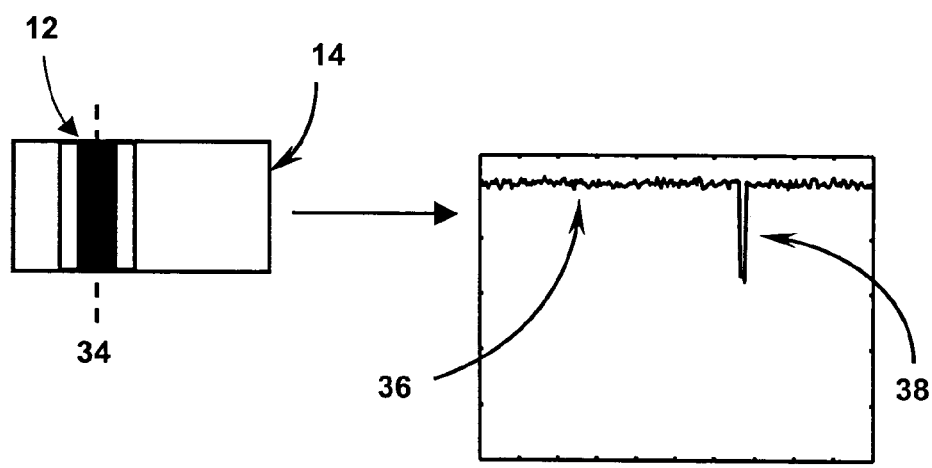
FIG. 3 is a diagram useful in discussing an analysis step according to the present invention.

Referring to FIG. 3, a widthwise scan 34 of a digital image of the image frame 14 through the uniform exposure 12 is analyzed by observing the values 36 at each pixel. If a few values 38 differ significantly from the rest of the values 36 in other areas of the scan, a defect has been detected. If multiple scans through the uniform exposure 12 exhibit a defect in the same widthwise location, the defect is located and categorized as a linear defect. Multiple scan lines can be averaged and a similar process applied to the averaged scan lines to enhance the detectability of a linear defect.

When a defect has been located, the location can be used in image analysis software to improve the appearance of an image, or in the case of a reference calibration image to improve the reliability of the calibration data.

The invention has been described in detail with particular reference to certain preferred embodiments thereof, but it will be understood that variations and modifications can be effected within the spirit and scope of the invention.

PARTS LIST 10 photographic film strip
12 uniform exposure
14 image frame
20 exposure step
22 process step
24 generate sampled image step
26 analyze sampled image step
28 located defect step
34 width-wise scan
36 pixel values
38 defect location pixel values

What is claimed is:

1. A method of locating a linear defect on a photographic element, the element having a useful imaging width and the defect aligned with length of the element, comprising the steps of:

a) exposing a region of the element to create a latent image which is substantially uniform across the useful imaging width of the element;

b) processing the latent image to produce a density signal;

c) sampling the density signal with a photometric device; and d) analyzing the sampled density data in the widthwise direction to determine if there are regions where uniformity differs from that of the uniform exposure, if such differences are found they are defects, if muliple widthwise analysis indicates a defect in the same widthwise location then those defects are categorized as a linear defect, further comprising the step of employing the location of the linear defect in processing a digital image derived from the photographic element wherein the photographic element is a negative photographic film having a plurality of layers and the exposure is high enough to produce a latent image that is developable in all layers of the film and the exposure is low enough to produce a latent image that upon development allows detection of any additional density due to a defect.

2. The method in claim 1, wherein the exposing step comprises exposing a plurality of regions, and analyzing the sampled density data in each region, whereby the likelihood of locating linear defects is enhanced.

3. The method in claim 1, wherein the analyzing step comprises averaging of samples aligned with the length of the element, whereby the significance of a nonuniformity is enhanced.

4. The method claimed in claim 1, wherein the exposure is sufficient to produce a developed image that is 1.5 above Dmin wherein Dmin is defined as the background of silver not imaged.

5. The method claimed in claim 1, wherein the photographic element is a film strip.

6. The method claimed in claim 1, wherein the processing step employs a standard photographic process.

7. The method claimed in claim 1, wherein the processing step employs an alternate photographic process.

8. The method claimed in claim 1, wherein the processing step employs a dry photographic process.

9. The method claimed in claim 8, wherein the dry photographic process includes thermal treatment.

10. The method claimed in claim 8, wherein the dry photographic process includes high pressure treatment.

11. A method of locating a linear defect on a photographic element, the element having a useful imaging width and the defect aligned with length of the element, comprising the steps of:
   a) exposing a region of the element to create a latent image which is substantially uniform across the useful imaging width of the element;
   b) processing the latent image to produce a density signal;
   c) sampling the density signal with a photometric device; and
   d) analyzing the sampled density data in the widthwise direction to determine if there are regions where uniformity differs from that of the uniform exposure, if such differences are found they are defects, if muliple widthwise analysis indicates a defect in the same widthwise location then those defect are categorized as a linear defect, further comprising the step of employing the location of the linear defect in processing a digital image derived from the photographic element wherein the exposing step comprises exposing a multiplicity of exposure levels varying along the length of the element, whereby a linear defect may be localized in exposure.

12. The method claimed in claim 11, wherein the analyzing step comprises averaging of samples aligned with the length of the element, whereby the significance of a nonuniformity is enhanced.

13. The method claimed in claim 11, wherein the photographic element is a negative photographic film having a plurality of layers and the exposure is high enough to produce a latent image that is developable in all layers of the film.

14. The method claimed in claim 11, wherein the photographic element is a negative photographic film and the exposure is low enough to produce a latent image that upon development allows detection of any additional density due to a defect.

15. The method claimed in claim 11, wherein the photographic element is a film strip.

16. The method claimed in claim 11, wherein the processing step employs a standard photographic process.

17. The method claimed in claim 11, wherein the processing step employs an alternate photographic process.

18. The method claimed in claim 11, wherein the processing step employs a dry photographic process.

19. The method claimed in claim 18, wherein the dry photographic process includes thermal treatment.

20. The method claimed in claim 18, wherein the dry photographic process includes high pressure treatment.

* * * * *